(12) United States Patent
Inamdar et al.

(10) Patent No.: US 10,982,887 B2
(45) Date of Patent: Apr. 20, 2021

(54) EXPANSION VALVE WITH SELECTABLE OPERATION MODES

(71) Applicant: Rheem Manufacturing Company, Atlanta, GA (US)

(72) Inventors: Harshad V. Inamdar, Fort Smith, AR (US); Christina M. Hughes, Fort Smith, AR (US); Derek L. Brasuell, Van Buren, AR (US); Sivakumar Gopalnarayanan, Plano, TX (US); Swapnil S. Khaire, Fayetteville, AR (US)

(73) Assignee: Rheem Manufacturing Company, Atlanta, GA (US)

( * ) Notice: Subject to any disclaimer, the term of this patent is extended or adjusted under 35 U.S.C. 154(b) by 133 days.

(21) Appl. No.: 16/197,233

(22) Filed: Nov. 20, 2018

(65) Prior Publication Data
US 2020/0158391 A1 May 21, 2020

(51) Int. Cl.
*F25B 41/06* (2006.01)
*F25B 39/00* (2006.01)

(52) U.S. Cl.
CPC ............ *F25B 41/062* (2013.01); *F25B 39/00* (2013.01); *F25B 2341/0653* (2013.01);
(Continued)

(58) Field of Classification Search
CPC .................. F25B 41/062; F25B 39/00; F25B 2341/0653; F25B 2700/21175;
(Continued)

(56) References Cited

U.S. PATENT DOCUMENTS 4,563,878 A * 1/1986 Baglione ................. F25B 49/02
62/115
4,674,292 A * 6/1987 Ohya ..................... F25B 41/062
62/223

(Continued)

FOREIGN PATENT DOCUMENTS

KR 20130134347 A 12/2013
WO 2011101889 A1 8/2011

OTHER PUBLICATIONS

International Search Report and Written Opinion for International (PCT) Application No. PCT/US2019/062002 dated Feb. 6, 2020.

*Primary Examiner* — Kun Kai Ma
(74) *Attorney, Agent, or Firm* — Troutman Pepper Hamilton Sanders LLP

(57) ABSTRACT

A compression refrigeration system includes a switch to select between a plurality of operation modes of a metering device that controls a rate of flow of a refrigerant to an evaporator of the compression refrigeration system. Each operation mode is associated with a respective refrigerant. Further, the compression refrigeration system includes a reference database that comprises pressure-temperature data associated with a plurality of refrigerants. Furthermore, the compression refrigeration system includes a valve adjustment engine that is communicatively coupled to the switch and the reference database. The valve adjustment engine controls the metering device based on an operation mode of the metering device that is selected using the switch. The operation mode is selected based on a refrigerant with which the compression refrigeration system is currently charged.

18 Claims, 6 Drawing Sheets

(52) U.S. Cl.
CPC . *F25B 2600/2513* (2013.01); *F25B 2700/197* (2013.01); *F25B 2700/21175* (2013.01)

(58) Field of Classification Search
CPC ........ F25B 2700/197; F25B 2600/2513; F25B 40/06; F25B 2400/0419
See application file for complete search history.

(56) References Cited

U.S. PATENT DOCUMENTS

| | | | | |
|---|---|---|---|---|
| 4,677,830 | A | * | 7/1987 | Sumikawa ........... B60H 1/3225 62/126 |
| 4,768,348 | A | * | 9/1988 | Noguchi ............... F25B 41/062 62/225 |
| 4,893,480 | A | * | 1/1990 | Matsui ................. B60H 1/3205 62/225 |
| 5,457,965 | A | * | 10/1995 | Blair .................... F25B 49/005 62/129 |
| 5,502,970 | A | * | 4/1996 | Rajendran ............. F25B 49/022 62/115 |
| 5,551,248 | A | * | 9/1996 | Derosier ................ F25B 49/02 62/155 |
| 2003/0144749 | A1 | * | 7/2003 | Hirayama .......... G05B 13/0275 700/42 |
| 2004/0068999 | A1 | * | 4/2004 | Jessen .................... F25B 49/02 62/222 |
| 2006/0032248 | A1 | | 2/2006 | Kates |
| 2013/0167568 | A1 | | 7/2013 | Park et al. |
| 2016/0313037 | A1 | * | 10/2016 | Takahashi ................ H02P 8/04 |

* cited by examiner

EXPANSION VALVE WITH SELECTABLE OPERATION MODES

TECHNICAL FIELD

The present disclosure relates generally to temperature control systems, and more particularly to temperature control systems that employ a refrigeration cycle, such as a heating, ventilation, air-conditioning and refrigeration (HVACR) system, with expansion valves that have selectable operation modes that allow the expansion valves to operate with multiple refrigerants.

BACKGROUND

To address climate change impacts, the HVACR industry is currently moving towards using alternative refrigerants having low global warming potential. However, different alternative refrigerants may have different characteristics with respect to each other and with respect to existing refrigerants that are currently being used in the HVACR systems, which in turn may require component and/or configuration changes to conventional HVACR systems for proper operation. For example, in conventional HVACR systems, electronic expansion valves are designed to be used with one type of refrigerant. In said example, charging a conventional HVACR system with a different refrigerant that is incompatible with the electronic expansion valve of the conventional HVACR system will require the existing electronic expansion valve to be replaced with another electronic expansion valve that is compatible with the different refrigerant for proper and efficient operation of the conventional HVACR. In other words, different refrigerants may need different HVACR systems with components, such as the electronic expansion valves, that are customized for efficient operation with the specific refrigerant used in the respective HVACR systems. Replacing the electronic expansion valves of all existing conventional HVACR systems to be compatible with the alternative refrigerants and/or maintaining numerous HVACR systems, each customized to be compatible with the refrigerant used therein may be inefficient and impractical.

It is noted that this background information is provided to reveal information believed by the applicant to be of possible relevance to the present disclosure. No admission is necessarily intended, nor should be construed, that any of the preceding information constitutes prior art against the present disclosure.

SUMMARY

In one aspect, the present disclosure relates to a compression refrigeration system that includes a metering device that is configured to control a rate of flow of a selected refrigerant to an evaporator coil heat exchanger, a sensor unit that is coupled to a suction line at an output of the evaporator coil heat exchanger and configured to determine a temperature and pressure of the selected refrigerant at the output of the evaporator coil heat exchanger; and an operation mode controller. The operation mode controller includes a reference database comprising pressure-temperature data associated with a plurality of refrigerants. The selected refrigerant is among the plurality of refrigerants. Further, the operation mode controller includes a switch to select between a plurality of operation modes of the metering device. Each operation mode is associated with one of the plurality of refrigerants. Furthermore, the operation mode controller includes a valve adjustment engine that is communicatively coupled to the switch, the reference database, the sensor unit, and the metering device. The valve adjustment engine is configured to control the metering device based on an operation mode of the plurality of operation modes that is selected using the switch. The operation mode of the metering device is selected based on the selected refrigerant.

In another aspect, the present disclosure relates to a method of an operation mode controller of a heating, ventilation, air-conditioning, and refrigeration (HVACR) system. The method includes receiving a first input from a switch at a valve adjustment engine of the operation mode controller. The first input is representative of a selected refrigerant with which the HVACR system is charged. The selected refrigerant is selected from a plurality of refrigerants using the switch, and each of the plurality of refrigerants is associated with an operating mode of an expansion valve. Further, the method includes receiving, at the valve adjustment engine, a second input from a sensor unit that is coupled to a suction line of the HVACR system at an output of an evaporator coil heat exchanger. The second input is representative of a temperature and a pressure of the selected refrigerant at the output of the evaporator coil heat exchanger. Furthermore, the method includes controlling, by the valve adjustment engine, the expansion valve using an operation mode associated with the selected refrigerant to maintain a predefined superheat value of the selected refrigerant at the output of the evaporator coil heat exchanger based on the first input from the switch, the second input from the sensor unit, and pressure-temperature data associated with the selected refrigerant from the reference database. The pressure-temperature data associated with the selected refrigerant is retrieved from a pressure-temperature data collection for the plurality of refrigerants using the first input.

In yet another aspect, the present disclosure relates to an operation mode controller of a compression refrigeration system. The operation mode controller includes a switch to select between operating modes of a metering device of the compression refrigeration system that is configured to control a flow of refrigerant to an evaporator coil heat exchanger of the compression refrigeration system. The operating modes include a first operating mode that is associated with a first refrigerant and a second operating mode that is associated with a second refrigerant. Further, the operation mode controller includes a reference database comprising first pressure-temperature data associated with the first refrigerant and second pressure-temperature data associated with the second refrigerant. Furthermore, the operation mode controller includes a valve adjustment engine that is communicatively coupled to the switch, the reference database, and the metering device. The valve adjustment engine is configured to control the metering device using the first operating mode when the compression refrigeration system is charged with the first refrigerant. The first operation mode uses the first pressure-temperature data to control the metering device. Further, the valve adjustment engine is configured to control the metering device using the second operating mode when the compression refrigeration system is charged with the second refrigerant. The second operation mode uses the second pressure-temperature data to control the metering device.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
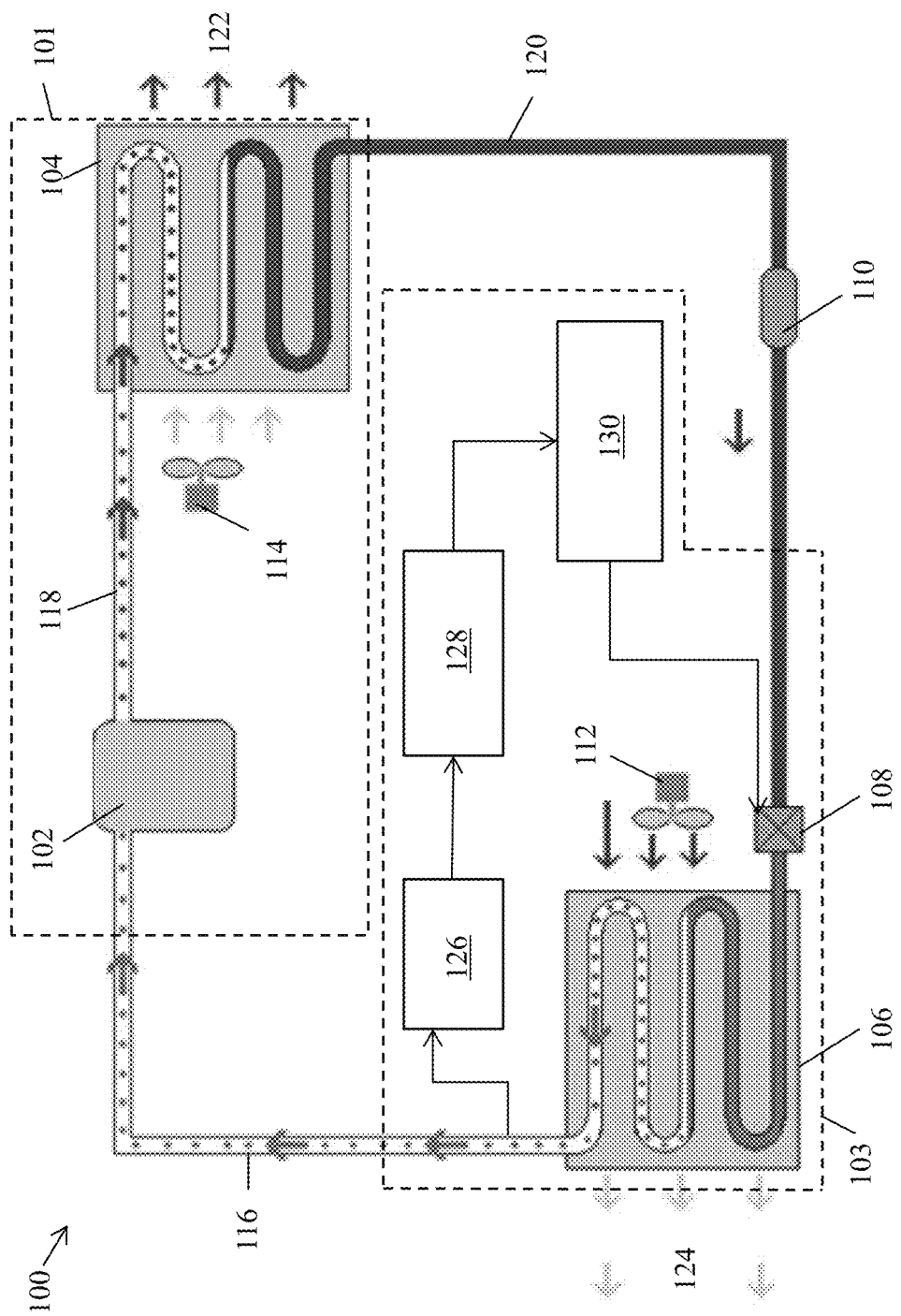
FIG. 1 is a schematic diagram of an HVACR system having an expansion valve with selectable operation modes, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes an example HVACR system that has an electronic expansion valve with selectable operational modes that allow the HVACR system to operate with multiple refrigerants. That is, the HVACR system of the present disclosure provides a user the ability to select and switch between operating modes and predefined superheat settings of the electronic expansion valve based on the refrigerant being used in the HVACR system. For example, if a first refrigerant is used, the HVACR system of the present disclosure allows a user to select a first operating mode of the electronic expansion valve and a first predefined superheat setting, and if a second refrigerant is used, the user can switch from the first operating mode to a second operating mode of the electronic expansion valve and a second predefined superheat setting. In said example, the first operation mode and first predefined superheat setting are optimized for the refrigerant properties of the first refrigerant and the second operation mode and the second predefined superheat setting are optimized for the refrigerant properties of the second refrigerant.

The HVACR system of the present disclosure allows for a proper and efficient operation of the electronic expansion valve and/or the HVACR system when the HVACR system is charged with a different refrigerant than the one for which the HVACR system is designed. Further, the HVACR system of the present disclosure eliminates the need to maintain different HVACR systems and/or electronic expansion valves for different refrigerants, which in turn reduces the number of SKU's (stock keeping units) because a single electronic expansion valve and/or HVACR system can be used with multiple refrigerants.

Furthermore, since the HVACR system of the present disclosure allows a single electronic expansion valve to be used with multiple refrigerants, the HVACR system of the present disclosure can be shipped refrigerant-free, where the installer can charge the HVACR system in the field and choose the refrigerant with which the HVACR system is charged. For example, if the manufacturer labels the HVACR system as being configured to operate with refrigerant A, refrigerant B, and refrigerant C, then, the installer may choose to charge the refrigerant-free HVACR system in the field with any one of refrigerant A, refrigerant B, and refrigerant C. One of skill in the art can understand and appreciate that even though the above example describes the HVACR system being configured to operate with three refrigerants, in other example embodiments, the HVACR system may be configured to operate with fewer or more refrigerants without departing from a broader scope of the present disclosure.

The refrigerant-free design of the HVACR system reduces the manufacturing cost because the refrigerant is not included in the bill of materials. Additionally, the refrigerant-free shipment of the HVACR system avoids the risk of having to transport potentially flammable refrigerants.

In one example, the HVACR system of the present disclosure includes an operation mode controller. The operation mode controller includes a selection switch (herein 'switch') that is configured to allow a user to select an operation mode of the electronic expansion valve based on the type of refrigerant used in the HVACR system (or the refrigerant with which the HVACR system is charged) and/or the corresponding predefined superheat settings associated with the refrigerant. The operation mode controller includes a valve adjustment engine that is coupled to the switch and configured to receive refrigerant data from the switch. The refrigerant data identifies the type of refrigerant used in the HVACR system and the corresponding predefined superheat settings associated with the refrigerant that need to be maintained by the HVACR system. In addition to refrigerant data, the valve adjustment engine receives sensor data representative of the refrigerant superheat characteristics from sensors coupled to a suction line at the output of an evaporator of the HVACR system. The valve adjustment engine is coupled to a motor controller that controls the electronic expansion valve. Additionally, the operation mode controller comprises a memory that has a refrigerant reference database stored therein. The refrigerant reference database may include data associated with a plurality of refrigerants, e.g., vapor pressure characteristics or pressure-temperature charts of at least the refrigerants with which the HVACR system is designed to be charged.

During operation, a user may use the switch to manually select the type of refrigerant with which the HVACR system is charged and the corresponding predefined superheat settings associated with the refrigerant. The switch is configured to allow the user to select one among a list of multiple refrigerants with which the HVACR system can be charged and/or predefined superheat settings associated with the refrigerants. Responsively, the valve adjustment engine receives refrigerant data from the switch, where the refrigerant data identifies the type of refrigerant with which the HVACR system is charged. Additionally, the valve adjustment engine receives sensor data from sensors that are coupled to the suction line of the HVACR system, where the sensor data is representative of the refrigerant superheat characteristics at the output of the evaporator of the HVACR system.

Upon receiving the refrigerant data and the sensor data, the valve adjustment engine may control the electronic expansion valve using an operation mode of the electronic expansion valve that is compatible with the type of refrigerant with which the HVACR system is charged. In particular, the valve adjustment engine may retrieve vapor pressure characteristics associated with the refrigerant. Further, based on the vapor pressure characteristics of the refrigerant and the sensor data comprising the refrigerant superheat characteristics at the output of the evaporator of the HVACR system, the valve adjustment engine determines if the electronic expansion valve needs to be adjusted to maintain a predefined superheat setting that is selected by the user via the switch. Responsive to determining that the electronic expansion valve needs to be adjusted, the valve adjustment engine calculates a required adjustment of a valve position of the electronic expansion valve to maintain the predefined superheat setting. Then, the valve adjustment engine generates and transmits a control signal to the motor controller which in turn adjusts a position of the electronic expansion valve based on the received control signal to maintain the predefined superheat setting, where the control signal is representative of the required adjustment as calculated.

The superheat characteristics of the refrigerant may include a temperature and a pressure of the refrigerant at the output of the evaporator, and the predefined superheat setting may include a superheat value of the refrigerant that needs to be maintained at the output of the evaporator. The superheat value may include a range of superheat temperature values, e.g., 6 to 10 degrees.

Example embodiments of the HVACR system with the electronic expansion valve having selectable operation modes will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the HVACR system of the present disclosure may be embodied in many different forms and should not be construed as limited to the embodiments set forth herein; rather, these embodiments are provided so that this disclosure will be thorough and complete, and will fully convey the scope of the technology to those appropriately skilled in the art. Further, example embodiments of the HVACR system of the present disclosure can be located in any type of environment (e.g., warehouse, attic, garage, storage, mechanical room, basement) for any type (e.g., commercial, residential, industrial) of user. Furthermore, even though the present disclosure describes an HVACR system, one of skill in the art can understand and appreciate that the electronic expansion valve with the selectable operation modes can be used in any system that employs a refrigeration cycle, such as a compression refrigeration system, a heat pump (reverse cycle application), etc.

Turning now to the figures, example embodiments of an HVACR system with the example electronic expansion valve having selectable operation modes will be described in connection with FIGS. 1-5. In particular, example components of the HVACR system with the electronic expansion valve having selectable operation modes will be described in connection with FIGS. 1-3 and 5; and example operations of the HVACR system will be described in connection with FIG. 4.

The HVACR system as described herein generally refers to any appropriate system that utilizes refrigerants in thermodynamic processes to cool and/or heat fluids for use in conditioning a temperature and/or a humidity of spaces serviced by the system. Referring to FIG. 1, an example HVACR system 100 of the present disclosure may include a condenser unit 101 that may be disposed outdoors and an evaporator unit 103 that may be disposed indoors. The condenser unit 101 may include a compressor 102, a condenser coil heat exchanger 104, and a condenser fan 114. Further, the evaporator unit 103 may include an evaporator coil heat exchanger 106, an electronic expansion valve 108, an evaporator fan 112, a sensor unit 126, an operation mode controller 128, and a motor controller 130.

As illustrated in FIG. 1, an output of the evaporator coil heat exchanger may be coupled to an input of the compressor 102 via a suction line 116. Further, an output of the compressor 102 may be coupled to an input of the condenser coil heat exchanger 104 via a discharge line 118, while an output of the condenser coil heat exchanger 104 may be coupled to an input of the evaporator coil heat exchanger 106 via a liquid line 120 that passes through a filter drier 110 and the electronic expansion valve 108. The sensor unit 126 may be coupled to the suction line 116 adjacent the output of the evaporator coil heat exchanger 106. An output of the sensor unit 126 may be coupled to an input of the operation mode controller 128, and an output of the operation mode controller 128 may be coupled to the motor controller 130 which in turn may be coupled to the electronic expansion valve 108.

In one example, the compressor 102 may be configured to raise the pressure of the refrigerant that flows through the HVACR system 100. In particular, the compressor 102 may receive the refrigerant in a vapor form via the suction line 116 at a low pressure, and discharge the refrigerant vapor to the condenser coil heat exchanger 104 via the discharge line 118 at a much higher pressure and a higher temperature. The refrigerant vapor discharged from the compressor 102 may flow through the condenser coils of the condenser coil heat exchanger 104. The refrigerant vapor that flows through the condenser coils may condense from vapor form to liquid form, giving off heat to air that the condenser fan 114 blows across the condenser coils. The high pressure liquid refrigerant that is output from the condenser coil heat exchanger 104 may flow down towards the electronic expansion valve 108 via the liquid line 120. Prior to reaching the electronic expansion valve 108, the high pressure liquid refrigerant in the liquid line 120 may flow through a filter drier 110 that is configured to prevent contaminants from flowing through the HVACR system 100, and particularly to the electronic expansion valve 108.

The electronic expansion valve 108 may be configured to control the flow of the liquid refrigerant to the evaporator coil heat exchanger 106. In particular, the high pressure liquid refrigerant that passes through the electronic expansion valve 108 may experience a pressure drop. The low pressure liquid or a mixture of liquid and vapor refrigerant (e.g., two phase refrigerant) that enters the evaporator coils of the evaporator coil heat exchanger 106 draws heat from the air the evaporator fan 112 blows across the evaporator coils, thereby causing the two phase refrigerant to vaporize and the air blowing across the evaporator coils to condition (e.g., cool) a temperature and/or a humidity of a space serviced by the HVACR system 100. The vaporized refrigerant goes back to the compressor 102 via the suction line to restart the cycle.

In particular, the flow of refrigerant to the evaporator coil heat exchanger 106 via the electronic expansion valve 108 may be controlled based on the superheat characteristics of the refrigerant at an output of the evaporator coil heat exchanger 106. For example, the flow of refrigerant to the evaporator coil heat exchanger 106 may be controlled based on the degree to which the refrigerant is superheated, which is determined by a difference in an actual temperature of the refrigerant and the saturation temperature of the refrigerant. The superheat value of the refrigerant is an important part of analyzing a system's performance. If a lower than normal superheat value is measured, too much refrigerant may be entering the evaporator for the heat load, which may be referred to as a flooded evaporator condition. Alternatively, if a higher than normal superheat value is measured, too little refrigerant may be entering the evaporator for the heat load, which may be referred to as a starved evaporator condition.

The superheat characteristics of the refrigerant may be measured using the sensor unit 126 that is coupled to the suction line 116 and adjacent the output of the evaporator coil heat exchanger 106. In particular, the sensor unit 126 may include a pressure sensor and a temperature sensor that are configured to measure the pressure and temperature of the refrigerant at the output of the evaporator coil heat exchanger 106. The measured pressure and temperature of the refrigerant at the output of the evaporator coil heat exchanger 106 may be transmitted to the operation mode controller 128 to determine a degree to which the refrigerant is superheated (hereinafter 'superheat value of the refrigerant'). On the basis of the superheat value of the refrigerant at the output of the evaporator coil heat exchanger 106 and the system manufacturer recommended predefined superheat value for the refrigerant, the HVACR system 100 may determine if the flow of refrigerant to the evaporator coil heat exchanger 106 needs to be adjusted using the electronic expansion valve 108. Responsive to determining whether the flow of the refrigerant to the evaporator coil heat exchanger 106 has to be adjusted, the HVACR system 100 may generate and transmit control signals to the motor controller 130 or an actuator associated with the electronic expansion valve 108 to control a position of the electronic expansion valve 108 for adjusting the flow of refrigerant therethrough.

Typically, the electronic expansion valve 108 is designed to operate with only one type of refrigerant. Accordingly, in conventional HVACR systems, changing a refrigerant that is used in the HVACR system necessitates a change of the electronic expansion valve to another electronic expansion valve that is compatible with the new refrigerant. However, the HVACR system 100 of the present disclosure is configured to allow one electronic expansion valve to operate with more than one refrigerant. In particular, the HVACR system 100 of the present disclosure includes an operation mode controller 128 that is configured to select between a plurality of operation modes of the electronic expansion valve 108, each operation mode being compatible with properties of a respective refrigerant.

The operation mode controller 128 may allow a user (e.g., technician in the field; technician at the manufacturing plant) to select the operation mode of the electronic expansion valve 108 based on a type of refrigerant with which the HVACR system 100 is currently charged. The user indirectly selects the operation mode of the electronic expansion valve 108 by selecting the type of refrigerant with which the HVACR system 100 is currently charged and/or the predefined superheat settings.

The operation modes of the electronic expansion valve 108 may also be field-selectable by the user based on the type of refrigerant with which the user charges the HVACR system 100. The ability to select the operation mode of the electronic expansion valve in the field allows the manufacturer to ship the HVACR system refrigerant-free, if so desired, as discussed above and to use the same electronic expansion valve with different refrigerants. In some example embodiments, the HVACR system 100 may be charged with a refrigerant at the manufacturing facility and the operation mode of the electronic expansion valve 108 may be selected by the manufacturer at the manufacturing facility. Once the user selects an operation mode of the electronic expansion valve using the switch 202, the operation mode controller 128 may be configured to control the electronic expansion valve 108 based on superheat characteristics of the refrigerant that are measured using the sensor unit 126 and pressure-temperature data associated with the type of refrigerant that is selected by the user using the switch 202.

Even though the present disclosure describes the flow of the refrigerant to the evaporator coil heat exchanger using an electronic expansion valve, one of skill in the art can understand and appreciate that the electronic expansion valve of the HVACR system can be replaced by any other appropriate controllable flow restriction or metering device that is functionally similar to the electronic expansion valve without departing from a broader scope of the present disclosure. For example, a thermostatic expansion valve that is mechanically controlled could be implemented with the example embodiments described herein.

Figure 2:
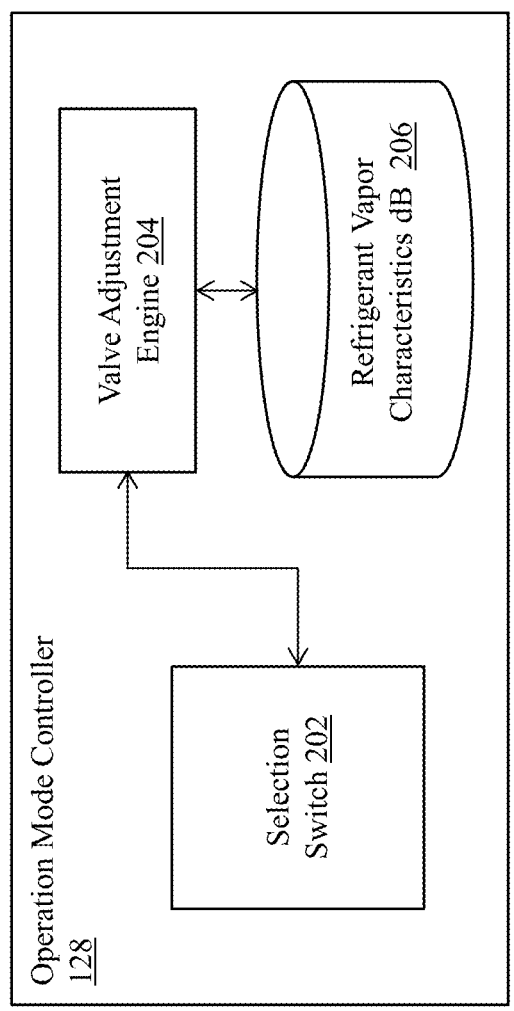
FIG. 2 is a schematic diagram of an operation mode controller of the HVACR system of FIG. 1, in accordance with example embodiments of the present disclosure.
Figure 5:
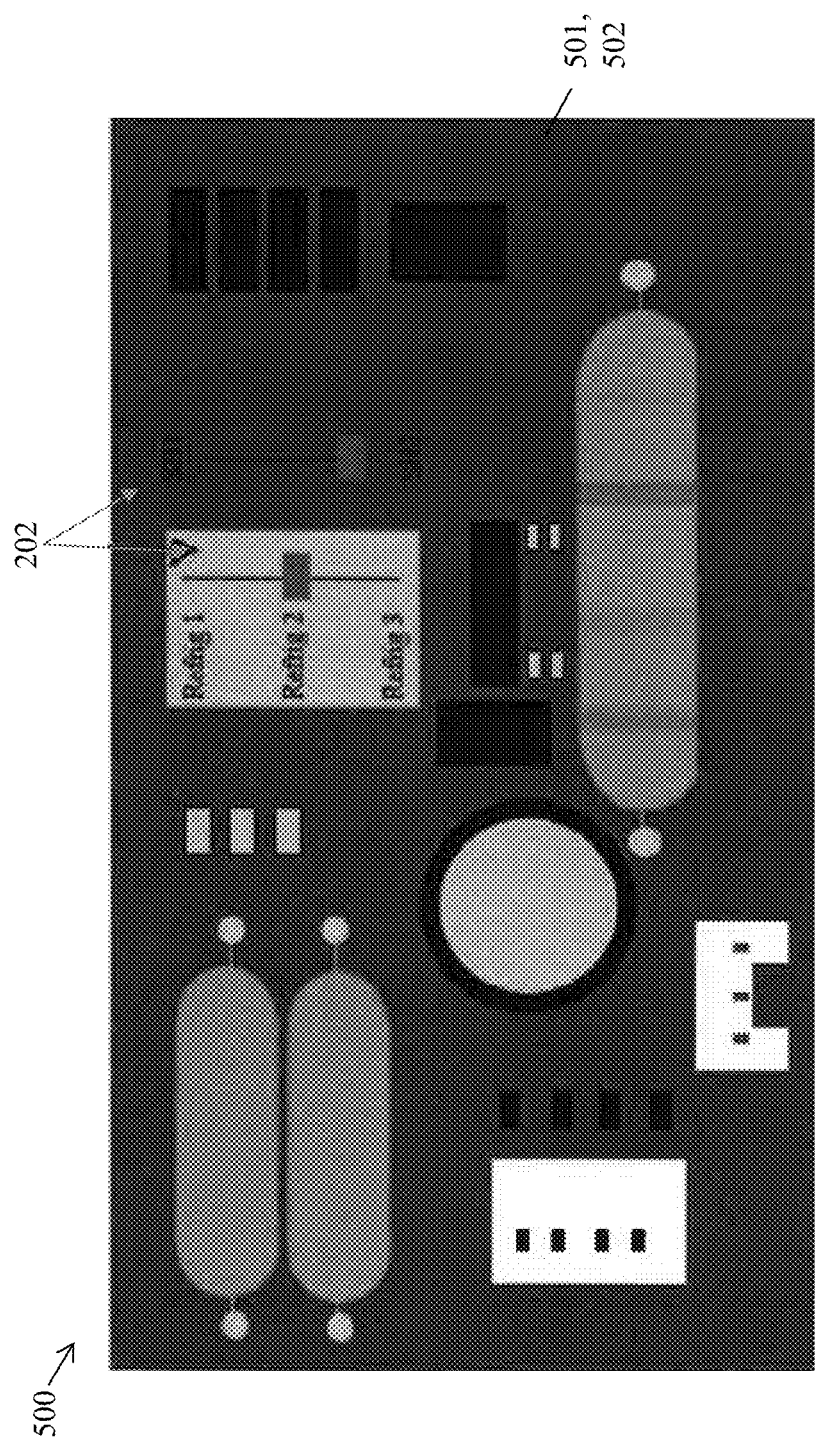
FIG. 5 is an example operation mode controller of the HVACR system with the selection switches implemented on a control board of the HVACR system, in accordance with example embodiments of the present disclosure.

The operation mode controller 128 may be described in greater detail below in association with FIGS. 2 and 5. Referring to FIGS. 2 and 5, the operation mode controller 128 may include a user interface 502 (shown in FIG. 5) that has a selection switch 202 (herein 'switch 202') which allows a user (technician in the field or manufacturer) to indirectly select an operation mode of the electronic expansion valve 108 by manually selecting the refrigerant with which the HVACR system 100 is charged and superheat settings associated with the refrigerant. For example, as illustrated in FIG. 5, the switch 202 includes toggle switches that allow the user to select between three refrigerants (e.g., refrig_1, refrig_2, and refrig_3) and two superheat settings (SH1, SH2). In one example, the user interface may be implemented on a control board 501 of the HVACR system 100 as illustrated in FIG. 5.

In said example embodiment of FIG. 5, on the basis of the refrigerant with which the HVACR system 100 is charged, a user may select one of the three refrigerants and one of the two superheat settings. Even though FIG. 5 illustrates toggle switches, one of skill in the art can understand and appreciate that in other example embodiments, the operation mode controller 128 may include any other appropriate switches without departing from a broader scope of the present disclosure, e.g., a DIP switch, a dial, other software based switches, etc. Further, even though FIG. 5 illustrates the user interface 502 of the operation mode controller 128 as having a switch for selecting the refrigerants and another switch for selecting the superheat settings, one of skill in the art can understand and appreciate that in other example embodiments, the user interface of the operation mode controller may have fewer or more switches without departing from a broader scope of the present disclosure. For example, in some example embodiments, the user interface 502 of the operation mode controller 128 may not include the switch to select the predefined superheat settings. Instead, the predefined superheat settings of the refrigerant that need to be maintained at the output of the evaporator may be hard coded or downloaded to and associated with the refrigerant in a memory of the HVACR system 100.

In addition to the switch 202, the operation mode controller 128 may include a valve adjustment engine 204 and a refrigerant vapor characteristics database 206. The valve adjustment engine 204 may be configured to receive input from the switch 202 indicating the type of refrigerant with which the HVACR system 100 is charged (i.e., the selected refrigerant) and/or the selected predefined superheat settings. Further, the valve adjustment engine 204 may be configured to receive input from the sensor unit 126, the input from the sensor unit 126 comprising measured refrigerant superheat characteristics, such as refrigerant pressure and temperature measured at the output of the evaporator coil heat exchanger 106. Furthermore, on the basis of the input from the switch 202 and the input from the sensor unit 126, the valve adjustment engine 204 may be configured to determine if a rate of flow of the refrigerant to the evaporator coil heat exchanger 106 needs to be adjusted to maintain the selected predefined superheat settings. In particular, to determine if a rate of flow of the refrigerant to the evaporator coil heat exchanger 106 needs to be adjusted to maintain the selected superheat settings, the valve adjustment engine 204 may retrieve pressure-temperature data associated with the refrigerant (selected using the switch 202) from the refrigerant vapor characteristics reference database 206. The pressure-temperature data associated with the refrigerant may be used to calculate the superheat value of the refrigerant at the output of the evaporator coil heat exchanger 106.

The refrigerant vapor characteristics reference database 206 may be configured to store pressure-temperature data associated with a plurality of refrigerants. In one example, the refrigerant vapor characteristics reference database 206 may include pressure-temperature charts associated with at least each refrigerant of the list of refrigerants presented to a user and from which the user can select one refrigerant using the switch 202. For example, in the embodiment of the HVACR system illustrated in FIG. 5 where the HVACR system 100 can be charged with one of three refrigerants (e.g., refrig_1, refrig_2, and refrig_3), the refrigerant vapor characteristics reference database 206 of the HVACR system 100 may include pressure-temperature data associated with at least the three different refrigerants, i.e., refrig_1, refrig_2, and refrig_3.

If the rate of flow of the refrigerant to the evaporator coil heat exchanger 106 needs to be adjusted, the valve adjustment engine 204 may be configured to calculate a required adjustment of the electronic expansion valve 108, and to generate and transmit a control signal corresponding to the required adjustment to the motor controller 130 associated with the electronic expansion valve 108 to adjust a position of the electronic expansion valve 108.

Figure 3:
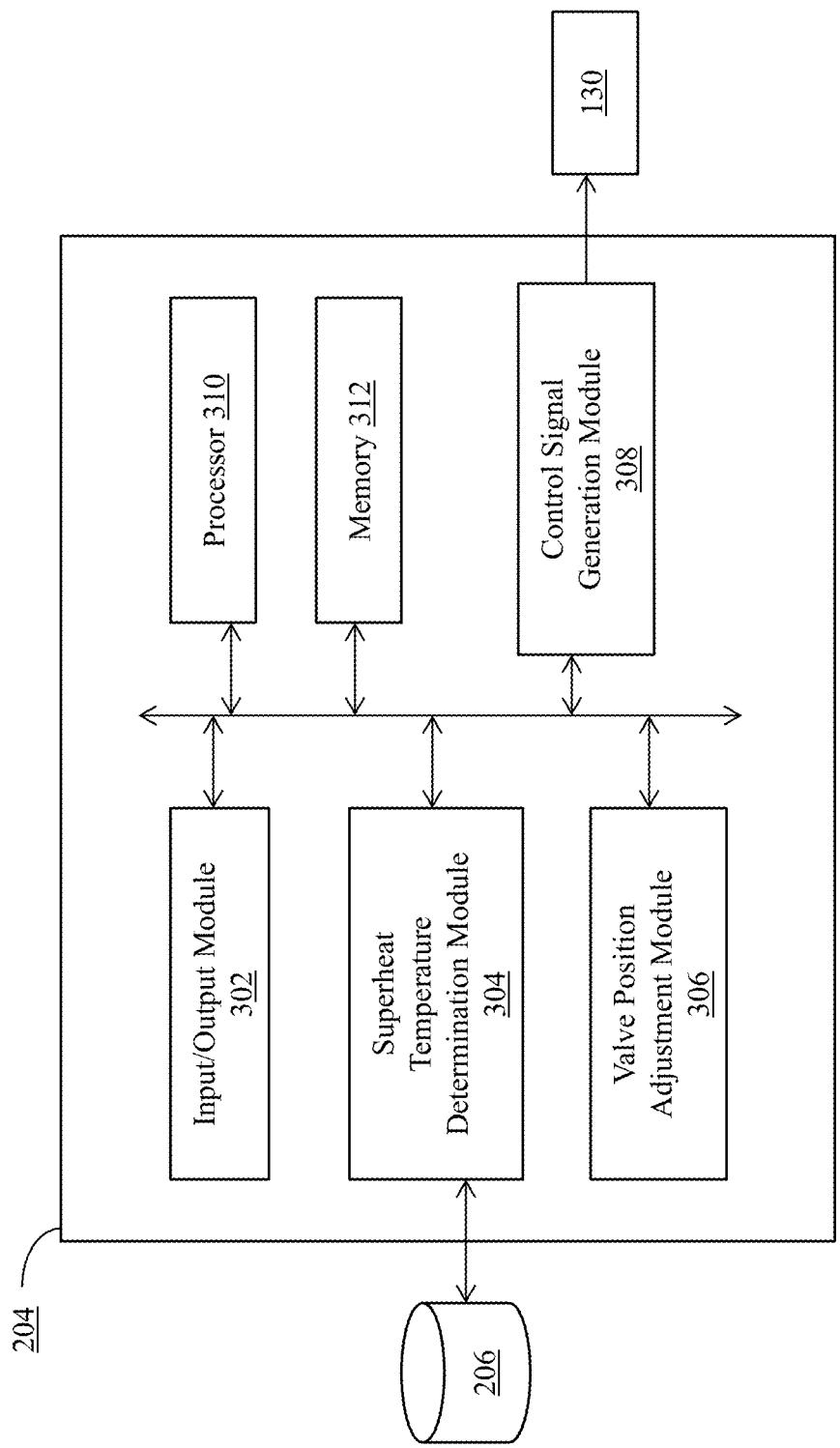
FIG. 3 is a schematic diagram of the valve adjustment engine of the HVACR system of FIG. 1, in accordance with example embodiments of the present disclosure.
Figure 4A:
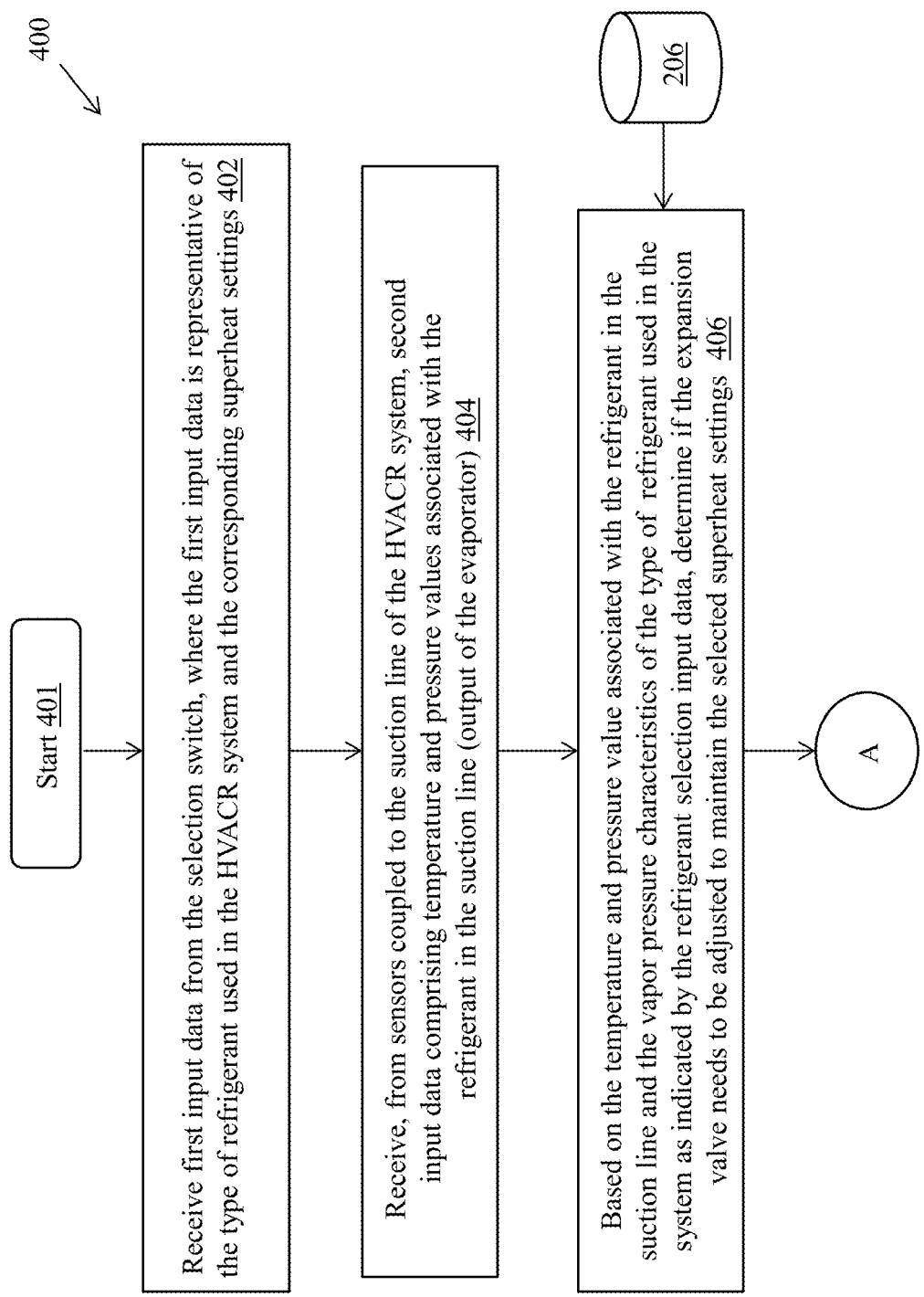
FIGS. 4A-4B (collectively 'FIG. 4') are flowcharts that illustrate an example operation of the HVACR system having the expansion valve with selectable operation modes, in accordance with example embodiments of the present disclosure.
Figure 4B:
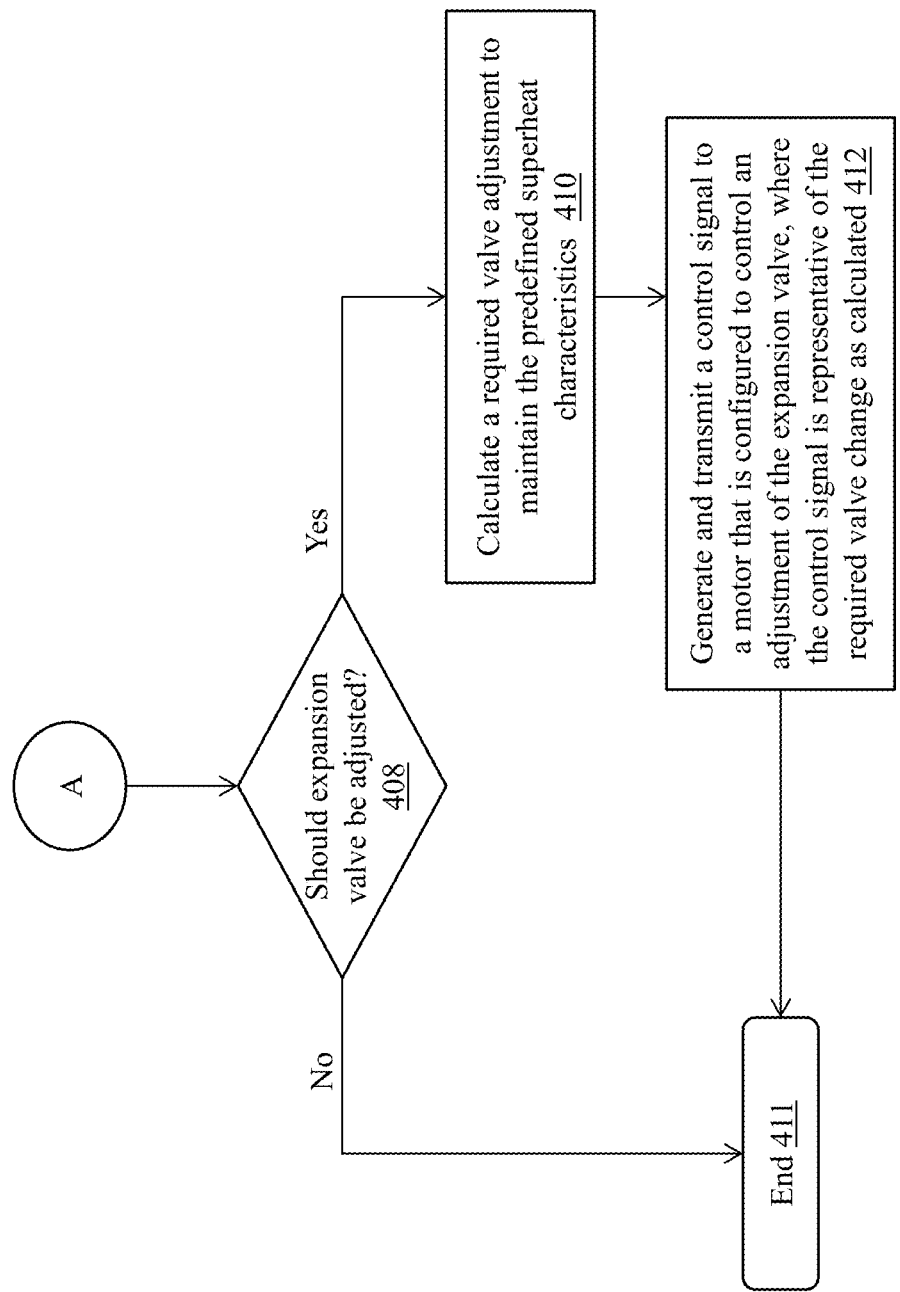

The operations of the valve adjustment engine 204 to allow the electronic expansion valve 108 of the HVACR system 100 to operate with multiple refrigerants will be described below in greater detail in association with FIGS. 3-4. In particular, FIG. 4 illustrates an example method 400 of a valve adjustment engine 204. FIG. 4 will be described in view of and by making reference to FIG. 3 as needed.

Although specific operations of the valve adjustment engine 204 are disclosed in the flowchart illustrated in FIG. 4, such operations are only non-limiting examples. That is, embodiments of the present invention are well suited to performing various other operations or variations of the operations recited in the flowcharts. It is appreciated that the operations in the flowcharts illustrated in FIG. 4 may be performed in an order different than presented, and that not all of the operations in the flowcharts may be performed.

All, or a portion of, the embodiments described by the flowcharts illustrated in FIG. 4 can be implemented using the valve adjustment engine 204 which resides, for example, in computer-usable media of a computer system, a memory of the HVACR system 100, or like device.

It is noted that the operation mode controller 128, the valve adjustment engine 204, and/or the different modules 302-308 of the valve adjustment engine 204 may be implemented as a hardware, such as circuits, processors, etc., software, and/or as a combination of hardware and software without departing from a broader scope of the present disclosure. In one example embodiment, the processor 310 of the valve adjustment engine 204 may be a multi-core processor or a combination of multiple single core processors. Further, the valve adjustment engine 204 may include a memory 312 coupled to the processor 310. The memory 312 may be non-transitory storage medium, in one embodiment, and a transitory storage medium in another embodiment. The memory 312 may include instructions that may be executed by the processor 310 to perform operations of the valve adjustment engine 204. In other words, in said example embodiment, the operations associated with the different modules 302-308 of the valve adjustment engine 204 may be executed using the processor 310.

In some example embodiments, the valve adjustment engine 204 may further include a communications/network module that may be configured to receive data from remote devices over a wireless communication link. For example, in some embodiments, the temperature and pressure sensors of the sensor unit 126 may be wireless sensors, the valve adjustment engine 204 with the communications/network module may be configured to wirelessly receive sensor data from the wireless temperature and pressure sensors. In said example embodiment where the valve adjustment engine 204 may include a communications/network module, the switch 202 of the operation mode controller 128 may not be provided as a hardware unit on user interface or a control board of the HVACR system 100. Instead, the switch 202 may be implemented as a software module that may be made available on a computing device (e.g., mobile phone) of a user. That is, the user may be allowed to select the refrigerant and/or superheat settings via an app that displays a software implemented switch on the user's mobile computing device. In said example embodiment, the input representative of the selected refrigerant and superheat settings may be wirelessly transmitted to the valve adjustment engine 204 of the operation mode controller 128.

Turning to FIG. 4, the example operation of the valve adjustment engine 204 begins at step 401 and proceed to step 402. In step 402, the input/output module 302 of the valve adjustment engine 204 may receive first input data from the switch 202 based on the refrigerant and/or superheat settings selected using the switch 202. The input data received from the switch 202 may be representative of the type of refrigerant used in the HVACR system and/or the selected superheat settings, i.e., the superheat value that needs to be maintained at an output of the evaporator coil heat exchanger 106. The operation mode of the electronic expansion valve 108 may be determined based on the type of refrigerant used in the HVACR system. As described above, in some example embodiments, the input data may not include the superheat settings. Instead, the superheat setting associated with the refrigerant may be pre-stored in the memory 312 or the refrigerant vapor characteristics reference database 206.

Further, in step 404, the input/output module 302 of the valve adjustment engine 204 may receive second input data from the sensor unit 126 that is coupled to the suction line 116 of the HVACR system 100 adjacent the output of the evaporator coil heat exchanger 106. The sensor unit 126, i.e., the temperature and pressure sensors coupled to the suction line 116 may be configured to continuously or periodically monitor and record temperature and pressure of the refrigerant at the output of the evaporator coil heat exchanger 106 during the operation of the HVACR system 100. Accordingly, the second input data received by the input/output module 302 of the valve adjustment engine 204 may comprise temperature and pressure of the refrigerant at the output of the evaporator coil heat exchanger 106.

Responsive to receiving the second input data, in step 406, the superheat temperature determination module 304 may calculate the superheat value of the refrigerant at the output of the evaporator coil heat exchanger 106 using the temperature and pressure of the refrigerant at the output of the evaporator coil heat exchanger 106 and a pressure-temperature chart associated with the type of the refrigerant used in the HVACR system 100 as indicated by the first input data from the switch 202. In one example embodiment, to calculate the superheat value of the refrigerant at the output of the evaporator coil heat exchanger 106, the superheat temperature determination module 304 may retrieve the pressure-temperature chart associated with the type of the refrigerant used in the HVACR system 100 from a plurality of pressure-temperature charts associated with other refrigerants that are stored in the refrigerant vapor characteristics database 206 using the first input data. Then, based on the pressure of the refrigerant at the output of the evaporator coil heat exchanger 106 from the second input data, the superheat temperature determination module 304 may determine a saturation temperature of the refrigerant using the pressure-temperature chart of the refrigerant that is retrieved from the refrigerant vapor characteristics database 206. Next, using the saturation temperature that is determined from the pressure-temperature chart of the refrigerant and the actual temperature of the refrigerant at the output of the evaporator coil heat exchanger 106 measured by the sensor unit 126, the superheat temperature determination module 304 may calculate the superheat value of the refrigerant at the output of the evaporator coil heat exchanger 106.

Responsive to calculating the superheat value of the refrigerant at the output of the evaporator coil heat exchanger 106, in step 406, the superheat temperature determination module 304 may operate in concert with the valve position adjustment module 306 to determine if the electronic expansion valve 108 needs to be adjusted to maintain a superheat value corresponding to the superheat settings selected using the switch 202 (or system manufacturer defined superheat value stored in a memory of the HVACR system 100). In particular, in step 406, the valve position adjustment module 306 may compare the calculated superheat value of the refrigerant at the output of the evaporator coil heat exchanger 106 with the system manufacturer defined or user selected superheat value of the refrigerant that needs to be maintained at the output of the evaporator coil heat exchanger 106. The system manufacturer defined or user selected superheat value of the refrigerant that needs to be maintained at the output of the evaporator coil heat exchanger 106 may be a temperature range, e.g., 8 to 10 degrees.

Based on an offset of the calculated superheat value of the refrigerant at the output of the evaporator coil heat exchanger 106 from the system manufacturer defined or user selected superheat value of the refrigerant that needs to be maintained at the output of the evaporator coil heat exchanger 106, in step 408, the valve position adjustment module 306 may determine if the electronic expansion valve 108 needs to be adjusted. If, the electronic expansion valve 108 needs to be adjusted, in operation 410, the valve position adjustment module 306 may calculate or determine a required adjustment of the electronic expansion valve to maintain the system manufacturer defined or user selected superheat value of the refrigerant at the output of the evaporator coil heat exchanger 106. The required adjustment of the electronic expansion valve 108 may be determined or calculated based on the offset of the calculated superheat value of the refrigerant at the output of the evaporator coil heat exchanger 106 from the system manufacturer defined or user selected superheat value of the refrigerant that needs to be maintained at the output of the evaporator coil heat exchanger 106. Then, in operation 412, the valve position adjustment module 306 may operate in concert with the control signal generation module 308 and the input/output module 302 to generate and transmit a control signal representative of the required adjustment to the motor controller 130 or the actuator associated with the electronic expansion valve 108 that is configured to adjust a position of the electronic expansion valve 108. Then, the operation of the valve adjustment engine 204 ends at step 411. Referring back to step 408, the operation of the valve adjustment engine 204 may also end if the valve position adjustment module 306 determines that the electronic expansion valve 108 does not need to be adjusted.

When the refrigerant of the HVACR system 100 is replaced with a new refrigerant, the operation 400 of the valve adjustment engine 204 may remain the same except that in step 406, the superheat value of the refrigerant at the output of the evaporator coil heat exchanger 106 may be calculated using another pressure-temperature chart that is associated with the new refrigerant and in steps 406-408, the determination to adjust the electronic expansion valve 108 may be based on another superheat setting associated with the new refrigerant without having to change the electronic expansion valve 108.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A compression refrigeration system comprising:
an expansion valve that is configured to control a rate of flow of a selected refrigerant to an evaporator coil heat exchanger;
a plurality of sensors that is coupled to a suction line at an output of the evaporator coil heat exchanger and configured to determine a temperature and a pressure of the selected refrigerant at the output of the evaporator coil heat exchanger; and
an operation mode controller that comprises:
a reference database comprising pressure-temperature data associated with a plurality of refrigerants, wherein the selected refrigerant is among the plurality of refrigerants;
a switch to select an operation mode from a plurality of operation modes of the expansion valve, each operation mode associated with one of the plurality of refrigerants; and
a processor that is communicatively coupled to the switch, the reference database, the plurality of sensors, and the expansion valve, the processor being configured to:
determine, based at least in part on the pressure-temperature data and the pressure of the selected refrigerant, a saturation temperature of the selected refrigerant at the output of the evaporator coil heat exchanger;
determine, based at least in part on the saturation temperature and the temperature of the selected refrigerant, a superheat value of the selected refrigerant at the output of the evaporator coil heat exchanger;
determine, based at least in part on the superheat value of the selected refrigerant, whether to adjust the expansion valve; and
in response to determining, based at least in part on the superheat value of the selected refrigerant, whether to adjust the expansion valve, output instructions to the expansion value to adjust.

2. The compression refrigeration system of claim 1:
wherein the expansion valve is adjusted based on the operation mode to maintain a predefined superheat value of the selected refrigerant at the output of the evaporator coil heat exchanger using a first input from the switch, a second input from the plurality of sensors, and the pressure-temperature data associated with the selected refrigerant from the reference database,
wherein the first input is representative of the selected refrigerant, and wherein the second input is representative of the temperature and the pressure of the selected refrigerant at the output of the evaporator coil heat exchanger.

3. The compression refrigeration system of claim 2, wherein to adjust the expansion valve based on the operation mode to maintain the predefined superheat value of the selected refrigerant at the output of the evaporator coil heat exchanger, the processor is further configured to:
calculate an offset of the superheat value of the selected refrigerant from the predefined superheat value of the selected refrigerant that has to be maintained at the output of the evaporator coil heat exchanger; and
calculate an adjustment of the expansion valve based on the offset to maintain the predefined superheat value of the selected refrigerant at the output of the evaporator coil heat exchanger; and
generate and transmit a control signal to an actuator associated with the expansion valve, the control signal being representative of the adjustment of the expansion valve.

4. The compression refrigeration system of claim 1, wherein the switch is a DIP switch.

5. The compression refrigeration system of claim 1, wherein the switch is a toggle switch.

6. The compression refrigeration system of claim 1, wherein the compression refrigeration system is a heating, ventilation, air-conditioning, and refrigeration (HVACR) system.

7. The compression refrigeration system of claim 1, wherein the plurality of sensors comprises a temperature sensor and a pressure sensor.

8. The compression refrigeration system of claim 3, wherein the actuator is a stepper motor controller.

9. A method of an operation mode controller of a heating, ventilation, air-conditioning, and refrigeration (HVACR) system comprising:
receiving, at a processor of the operation mode controller, a first input from a switch, the first input representative of a selected refrigerant with which the HVACR system is charged,
wherein the selected refrigerant is selected from a plurality of refrigerants using the switch, and wherein each of the plurality of refrigerants is associated with an operating mode of an expansion valve;
receiving, at the processor, a second input from a plurality of sensors that is coupled to a suction line of the HVACR system at an output of an evaporator coil heat exchanger, the second input representative of a temperature and a pressure of the selected refrigerant at the output of the evaporator coil heat exchanger;
determining, by the processor, a saturation temperature of the selected refrigerant using pressure-temperature data of the selected refrigerant stored in a reference database and the pressure of the selected refrigerant at the output of the evaporator coil heat exchanger that is received at the second output;
determining, by the processor, a superheat value of the selected refrigerant at the output of the evaporator coil heat exchanger using the saturation temperature of the selected refrigerant and the temperature of the selected refrigerant at the output of the evaporator coil heat exchanger that is received from the second input; and
controlling, by the processor, the expansion valve using an operation mode associated with the selected refrigerant to maintain a predefined superheat value of the selected refrigerant at the output of the evaporator coil heat exchanger based on the first input from the switch, the second input from the plurality of sensors, pressure-temperature data associated with the selected refrigerant from the reference database, the saturation temperature, and the superheat value.

10. The method of claim 9, wherein controlling the expansion valve of the HVACR system to maintain a predefined superheat value of the selected refrigerant at the output of the evaporator coil heat exchanger further comprises:
calculating, by the processor, an offset of the superheat value of the selected refrigerant from the predefined superheat value of the selected refrigerant that has to be maintained at the output of the evaporator coil heat exchanger; and
calculating, by the processor, an adjustment of the expansion valve based on the offset to maintain the predefined superheat value of the refrigerant at the output of the evaporator coil heat exchanger; and generating and transmitting, by the processor, a control signal to a motor controller of the expansion valve, the control signal being representative of the adjustment of the expansion valve.

11. An operation mode controller of a compression refrigeration system comprising:

a switch to select between operating modes of an expansion valve of the compression refrigeration system that is configured to control a flow of refrigerant to an evaporator coil heat exchanger of the compression refrigeration system, the operating modes comprising a first operating mode that is associated with a first refrigerant and a second operating mode that is associated with a second refrigerant;

a reference database comprising first pressure-temperature data associated with the first refrigerant and second pressure-temperature data associated with the second refrigerant; and a processor that is communicatively coupled to the switch, the reference database, and the expansion valve, the processor being configured to:

control the expansion valve using the first operating mode when the compression refrigeration system is charged with the first refrigerant, wherein the first operation mode uses the first pressure-temperature data to calculate a first saturation temperature of the first refrigerant and a first superheat value of the first refrigerant, the first superheat value used to control the expansion valve; and control the expansion valve using the second operating mode when the compression refrigeration system is charged with the second refrigerant, wherein the second operation mode uses the second pressure-temperature data to calculate a second saturation temperature of the second refrigerant and a second superheat value of the second refrigerant, the second superheat value used to control the expansion valve.

12. The operation mode controller of claim 11, wherein to control the expansion valve using the first operating mode of the expansion valve, the processor is further configured to:

retrieve the first pressure-temperature data associated with the first refrigerant from the reference database using a first input from the switch, wherein the first input identifies the first refrigerant;

calculate the superheat value of the first refrigerant at the output of the evaporator coil heat exchanger using the first pressure-temperature data and a second input received from a plurality of sensors that is coupled to a suction line of the compression refrigeration system at the output the evaporator coil heat exchanger, the second input comprising temperature and pressure of the first refrigerant at the output of the evaporator coil heat exchanger;

calculate an offset of the superheat value of the first refrigerant from a first predefined superheat value associated with the first refrigerant that is to be maintained at the output of the evaporator coil heat exchanger; and calculate an adjustment of the expansion valve based on the offset to maintain the first predefined superheat value associated with the first refrigerant at the output of the evaporator coil heat exchanger; and generate and transmit a control signal to a motor controller of the expansion valve, the control signal being representative of the adjustment of the expansion valve.

13. The operation mode controller of claim 11, wherein to control the expansion valve using the second operating mode of the expansion valve, the processor is further configured to:

retrieve the second pressure-temperature data associated with the second refrigerant from the reference database using a first input from the switch, wherein the first input identifies the second refrigerant;

calculate the superheat value of the second refrigerant at the output of the evaporator coil heat exchanger using the second pressure-temperature data and a second input received from a plurality of sensors that is coupled to a suction line of the compression refrigeration system at the output the evaporator coil heat exchanger, the second input comprising temperature and pressure of the second refrigerant at the output of the evaporator coil heat exchanger;

calculate an offset of the superheat value of the second refrigerant from a second predefined superheat value associated with the second refrigerant that is to be maintained at the output of the evaporator coil heat exchanger; and calculate an adjustment of the expansion valve based on the offset to maintain the second predefined superheat value associated with the second refrigerant at the output of the evaporator coil heat exchanger; and generate and transmit a control signal to a motor controller of the expansion valve, the control signal being representative of the adjustment of the expansion valve.

14. The operation mode controller of claim 11, wherein the switch is a DIP switch.

15. The operation mode controller of claim 11, wherein the switch is a toggle switch.

16. The operation mode controller of claim 11, wherein the compression refrigeration system is a heating, ventilation, air-conditioning, and refrigeration (HVACR) system.

17. The operation mode controller of claim 12, wherein the plurality of sensors comprises a temperature sensor and a pressure sensor.

18. The operation mode controller of claim 12, wherein the motor controller is a stepper motor controller.

* * * * *